(12) United States Patent
Hashimoto et al.

(10) Patent No.: US 9,487,605 B2
(45) Date of Patent: Nov. 8, 2016

(54) METHOD FOR PRODUCING HYDROGENATED UNSATURATED POLYHYDROXYHYDROCARBON POLYMER

(71) Applicant: NIPPON SODA CO., LTD., Tokyo (JP)

(72) Inventors: Hiroki Hashimoto, Toride (JP); Yoshio Hayakawa, Ichihara (JP); Mitsuhiro Nakamura, Chiba (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

(21) Appl. No.: 14/758,872

(22) PCT Filed: Dec. 25, 2013

(86) PCT No.: PCT/JP2013/084674
§ 371 (c)(1),
(2) Date: Jul. 1, 2015

(87) PCT Pub. No.: WO2014/109232
PCT Pub. Date: Jul. 17, 2014

(65) Prior Publication Data
US 2016/0002375 A1    Jan. 7, 2016

(30) Foreign Application Priority Data
Jan. 10, 2013   (JP) ................. 2013-002503

(51) Int. Cl.
| | |
|---|---|
| C08F 36/04 | (2006.01) |
| C08F 136/06 | (2006.01) |
| C08F 8/04 | (2006.01) |
| C08C 19/02 | (2006.01) |

(52) U.S. Cl.
CPC ............ *C08F 136/06* (2013.01); *C08C 19/02* (2013.01); *C08F 8/04* (2013.01); *C08F 36/04* (2013.01)

(58) Field of Classification Search
CPC ........... C08F 36/04; C08F 8/04; C08C 19/02
USPC ......................... 525/51, 338, 331.9
See application file for complete search history.

(56) References Cited

U.S. PATENT DOCUMENTS

| | | | | | |
|---|---|---|---|---|---|
| 3,442,877 | A | * | 5/1969 | Ellert ................ | C08F 8/04 525/339 |
| 3,446,740 | A | * | 5/1969 | Young ................ | C10M 143/12 44/445 |
| 3,770,619 | A | * | 11/1973 | Derrien ............ | B01J 23/40 208/143 |
| 3,994,868 | A | | 11/1976 | Inomata et al. | |
| 4,258,222 | A | * | 3/1981 | Mohring ............ | C07C 29/10 521/109.1 |
| 6,815,509 | B2 | * | 11/2004 | Miyamoto ........ | C08F 8/04 525/332.8 |

FOREIGN PATENT DOCUMENTS

| | | |
|---|---|---|
| CN | 1160405 A | 9/1997 |
| EP | 0 319 967 A1 | 6/1989 |
| JP | S52-24559 B2 | 7/1977 |
| JP | S53-26890 A | 3/1978 |
| JP | S54-40897 A | 3/1979 |
| JP | H07-247302 A | 9/1995 |
| JP | H07-247303 A | 9/1995 |
| JP | H09-100317 A | 4/1997 |
| JP | H09-176233 A | 7/1997 |
| WO | 96/11215 A2 | 4/1996 |

OTHER PUBLICATIONS

Podesva, Journal of Applied Polymer Science, vol. 74, pp. 3203-3213 (1999).*
Jan. 28, 2014 International Search Report issued in International Application No. PCT/JP2013/084674.
Bouchal et al., "The Hydrogenation of HO-Terminated Telechelic Polybutadienes in the Presence of a Homogeneous Hydrogenation Catalyst Based on Tris(triphenylphosphine)rhodium Chloride," Angewandte Makromolekulare Chemie. Applied Macromolecular Chemistry and Physics, vol. 165, pp. 165-180, 1989.
Aug. 1, 2016 Extended European Search Report issued in European Application No. 13871157.7.
Aug. 24, 2016 Office Action issued in Chinese Application No. 201380069385.0.

* cited by examiner

*Primary Examiner* — Robert C Boyle
(74) *Attorney, Agent, or Firm* — Oliff PLC

(57) ABSTRACT

Provided is a method for producing a hydrogenated unsaturated polyhydroxyhydrocarbon polymer capable of suppressing side reactions such as a hydrogenolyzis reaction of a terminal hydroxyl group and achieving a high hydrogenation rate in a short reaction time. A hydrogenated unsaturated polyhydroxyhydrocarbon polymer is obtained by a method including: hydrogenating an unsaturated polyhydroxyhydrocarbon polymer under the presence of a hydrogenation catalyst and a reaction solvent in the following two stages (I) and (II): (I) carrying out a hydrogenation reaction in a temperature range of 80° C. to 130° C. until a hydrogenation rate of at least 30 mol % is achieved; and then (II) carrying out a hydrogenation reaction at a temperature higher than 130° C. until a hydrogenation rate of at least 98 mol % is achieved.

4 Claims, No Drawings

METHOD FOR PRODUCING HYDROGENATED UNSATURATED POLYHYDROXYHYDROCARBON POLYMER

TECHNICAL FIELD

The present invention relates to a method for producing a hydrogenated unsaturated polyhydroxyhydrocarbon polymer. More specifically, the present invention relates to a method for producing a hydrogenated unsaturated polyhydroxyhydrocarbon polymer that is capable of suppressing side reactions such as a hydrogenolysis reaction of a terminal hydroxyl group and achieving a high hydrogenation rate in a short reaction time.

Priority is claimed on Japanese Patent Application No. 2013-002503, filed Jan. 10, 2013, the content of which is incorporated herein by reference.

BACKGROUND ART

The so-called terminal hydroxyl group-modified polybutadiene hydrides in which a hydroxyl group is bound to the terminal of the main chain of a polybutadiene hydride have been known. The terminal hydroxyl group-modified polybutadiene hydride can be obtained by subjecting the carbon-carbon double bond of the main chain or side chain in a terminal hydroxyl group-modified polybutadiene to a hydrogenation reaction. For example, in Patent Document 1, hydrogenation of a polyhydroxy polybutadiene at 100° C. in the presence of a carbon supported ruthenium catalyst or alumina supported ruthenium catalyst by holding the system pressure at 50 mg/cm$^2$ (about 4.9 Pa) has been described. In addition, in Patent Document 2, a method of hydrogenating an unsaturated polyhydroxyhydrocarbon polymer characterized by carrying out a hydrogenation reaction by keeping the reaction temperature constant (for example, 120° C.±5° C.) and setting the reaction pressure to a pressure of 35 kg/cm$^2$ (about 3.4 MPa) or less until a hydrogenation rate of 60% or higher is achieved, and then carrying out a hydrogenation reaction by keeping the reaction temperature constant (for example, 120° C.±5° C.) and setting the reaction pressure to a pressure exceeding 35 kg/cm$^2$ until a hydrogenation rate of 99% or higher is achieved, has been proposed.

CITATION LIST

Patent Documents

[Patent Document 1] Japanese Examined Patent Application, Second Publication No. Sho 52-24559
[Patent Document 2] Japanese Unexamined Patent Application, First Publication No. Hei 9-100317

SUMMARY OF INVENTION

Technical Problem

However, in the conventional methods, when attempting to achieve a high hydrogenation rate in a short reaction time, side reactions such as cutting of the terminal hydroxyl group were likely to occur, and a hydroxyl value of hydrogenated unsaturated polyhydroxyhydrocarbon polymer tended to decrease.

An object of the present invention is to provide a method for producing a hydrogenated unsaturated polyhydroxyhydrocarbon polymer which can suppress side reactions such as a hydrogenolysis reaction of a terminal hydroxyl group and achieve a high hydrogenation rate in a short reaction time.

Solution to Problem

As a result of conducting intensive research in order to solve the problems described above, the inventors of the present invention discovered that the above problems can be solved by a method including steps of carrying out a hydrogenation reaction in a temperature range of 80° C. to 130° C. until a hydrogenation rate of at least 30 mol % is achieved, and then carrying out a hydrogenation reaction at a temperature higher than 130° C. until a hydrogenation rate of at least 98 mol % is achieved, thereby leading to completion of the present invention.

That is, the present invention includes the following aspects.

[1] A method for producing a hydrogenated unsaturated polyhydroxyhydrocarbon polymer including:
hydrogenating an unsaturated polyhydroxyhydrocarbon polymer in a hydrogen atmosphere under the presence of a hydrogenation catalyst and a reaction solvent in the following two stages (I) and (II):
(I) carrying out a hydrogenation reaction in a temperature range of 80° C. to 130° C. until a hydrogenation rate of at least 30 mol % is achieved; and then
(II) carrying out a hydrogenation reaction at a temperature higher than 130° C. until a hydrogenation rate of at least 98 mol % is achieved.

[2] The method according to [1], wherein a hydrogen pressure in stage (I) is equal to or less than 6 MPa.

[3] The method according to [1] or [2], wherein a hydrogen pressure in stage (II) is equal to or more than 2 MPa.

[4] The method according to any one of [1] to [3], wherein the hydrogenation catalyst is at least one selected from the group consisting of a nickel-based catalyst, a cobalt-based catalyst, a ruthenium-based catalyst, a rhodium-based catalyst, a palladium-based catalyst and a platinum-based catalyst.

Advantageous Effects of Invention

According to the method of the present invention, it is possible to produce a hydrogenated unsaturated polyhydroxyhydrocarbon polymer with a high hydrogenation rate while suppressing the side reactions.

DESCRIPTION OF EMBODIMENTS

Unsaturated Polyhydroxyhydrocarbon Polymer

An unsaturated polyhydroxyhydrocarbon polymer used in the present invention is a hydrocarbon-based polymer having a carbon-carbon double bond in the main chain or side chain of the molecule and having an average of 0.5 or more hydroxyl groups within the molecule.

The unsaturated polyhydroxyhydrocarbon polymer can be prepared by various methods. For example, it can be produced by subjecting a conjugated diene monomer alone, a mixture of two or more types of conjugated diene monomers, or a mixture of a conjugated diene monomer and another monomer copolymerizable therewith to: 1) a method of allowing polymerization by using hydrogen peroxide as a reaction initiator; 2) a method of allowing polymerization by using other reaction initiators, for example, an azobisisonitrile compound having a functional group; 3) a method of allowing anionic polymerization by using an alkali metal such as sodium and lithium or a complex of an alkali metal with a polycyclic aromatic compound as a catalyst, and then reacting an alkylene oxide, epichlorohydrin or the like, followed by a treatment with a protic acid such as hydrochloric acid, sulfuric acid and acetic acid; and the like.

In this case, examples of raw material conjugated diene monomers include 1,3-butadiene, isoprene, 1,3-pentadiene and chloroprene, and examples of the other copolymerizable monomers include styrene, acrylonitrile, acrylic acid, methacrylic acid, acrylic acid alkyl esters and methacrylic acid alkyl esters.

Specific examples of the polymer obtained by the above methods include polyhydroxy polybutadiene, polyhydroxy polyisoprene, polyhydroxy poly(1,3-pentadiene) and the above respective copolymers having a hydroxy group. Of these, polybutadienes having hydroxyl groups at both ends are preferred. The unsaturated polyhydroxyhydrocarbon polymers used in the present invention may be those constituted only of 1,4-bonds or those constituted only of 1,2-bonds, but polymers in which those constituted of 1,4-bonds (1,4-bond units) and those constituted of 1,2-bonds (1,2-bond units) co-exist are preferred. The molar ratio of (1,2-bond units)/(1,4-bond units) is not particularly limited, but is preferably from 45/55 to 95/5, and more preferably from 50/50 to 90/10. In addition, the number average molecular weight of the unsaturated polyhydroxyhydrocarbon polymer used in the present invention is preferably from 300 to 10,000, and more preferably from 500 to 6,000. The number of hydroxyl groups included in the unsaturated polyhydroxyhydrocarbon polymer is, as a hydroxyl value, preferably at least 50 KOH mg/g, and more preferably at least 60 KOH mg/g.

In addition, it is possible to use a commercially available product as the unsaturated polyhydroxyhydrocarbon polymer. Examples thereof include NISSO-PB-G-1000 (manufactured by Nippon Soda Co., Ltd.), NISSO-PB-G-2000 (manufactured by Nippon Soda Co., Ltd.), NISSO-PB-G-3000 (manufactured by Nippon Soda Co., Ltd.) and Poly bd R45HT (manufactured by Idemitsu Kosan Co., Ltd.). One type of these can be used alone or two or more types thereof can be used in combination.

The hydrogenation catalyst used in the present invention is not particularly limited as long as it is a catalyst for smoothly allowing the hydrogenation reaction of unsaturated polyhydroxyhydrocarbon polymers to proceed. Examples of the hydrogenation catalysts that can be used in the present invention include a nickel-based catalyst, a cobalt-based catalyst, a ruthenium-based catalyst, a rhodium-based catalyst, a palladium-based catalyst, a platinum-based catalyst, and a mixture or alloy-based catalyst thereof. Of these, from the viewpoint that the hydrogenolysis of hydroxyl groups is less likely to occur, nickel-based catalysts and ruthenium-based catalysts are preferred.

These hydrogenation catalysts can be used alone, as a solid or soluble homogeneous complex, or can be used as a carrier-supported form which is supported on a carrier such as carbon, silica and diatomaceous earth. Among these, a catalyst supported on a carrier made of diatomaceous earth is preferred. Furthermore, as the hydrogenation catalyst, in addition to the metal catalysts described above, metal complexes obtained by reducing a compound containing nickel, titanium, cobalt and the like with an organometallic compound (for example, trialkyl aluminum, alkyl lithium and the like) can also be used.

The amount of the hydrogenation catalyst used in the method of the present invention varies depending on the type and loading amount of the metal and the like, but is preferably from 0.01 to 20% by weight with respect to the unsaturated polyhydroxyhydrocarbon polymer. The hydrogenation catalyst may be attached to a reactor as a fixed bed, or may be suspended in a reaction solvent.

For the reaction solvent used in the present invention, various organic solvents that have been used conventionally are used. As the organic solvent, hydrocarbons such as hexane, heptane, octane, nonane, decane, cyclohexane, methylcyclohexane, isoparaffin, benzene, toluene, xylene, trimethylbenzene and solvent naphtha; alcohols such as n-propyl alcohol, isopropyl alcohol and n-butyl alcohol; ethers such as diethyl ether, dipropyl ether and tetrahydrofuran; esters such as ethyl acetate and butyl acetate; or a mixed solvent composed of any combination of these can be mentioned, although it is not limited to these exemplified solvents.

The amount of the reaction solvent used in the method of the present invention is not particularly limited, but is preferably from 30 to 300 parts by weight with respect to 100 parts by weight of the unsaturated polyhydroxyhydrocarbon polymer.

Hydrogen used in the present invention is not particularly limited as long as it does not contain a component to become a catalyst poison.

In the method of the present invention, the hydrogenation reaction is carried out in at least two separate stages.

First, stage (I) is a stage from the initiation of the hydrogenation reaction until a hydrogenation rate of a predetermined level or higher is achieved. The predetermined level of hydrogenation rate is 30 mol %, preferably 40 mol %, more preferably 60 mol %, and most preferably 85 mol %. The upper limit of the predetermined hydrogenation rate serving as the end point of the stage (I) is preferably 97 mol %. If the hydrogenation rate serving as the end point of the stage (I) is set too low, in stage (II), the percentage of occurrence of the hydrogenolysis reaction of hydroxyl groups and the thermal polymerization of unsaturated bonds increases, and there is a tendency in that the hydroxyl value of the hydrogenated unsaturated polyhydroxyhydrocarbon polymer reduces.

It should be noted that the hydrogenation rate (mol %) is a value defined by the following equation.

$$\text{Hydrogenation rate (mol \%)} = (A/B) \times 100$$

In the equation, A denotes the number of moles of the monomer units that are hydrogenated in a hydrogenated unsaturated polyhydroxyhydrocarbon polymer, and B denotes the number of moles of the total monomer units contained in the hydrogenated unsaturated polyhydroxyhydrocarbon polymer. A and B are calculated by an integration ratio of $^1$H-NMR.

In stage (I), the temperature is maintained in the range from 80° C. to 130° C., preferably from 100 to 130° C., and more preferably from 120 to 130° C. If the reaction temperature is lowered, there is a tendency in that the hydrogenation reaction does not proceed, or the reaction becomes extremely slow. If the reaction temperature in stage (I) is increased, the progress rate of the thermal polymerization reaction (side reaction) between the unsaturated polyhydroxyhydrocarbon polymers tends to increase. In addition, the hydrogen pressure is preferably adjusted to 6 MPa or less, more preferably 4 MPa or less, and still more preferably 2 MPa or less, by the introduction of hydrogen gas. The lower limit of the hydrogen pressure is preferably 0.2 MPa.

By carrying out the hydrogenation reaction under such a hydrogen pressure, it is possible to suppress the side reactions.

Next, stage (II) is a stage from the predetermined hydrogenation rate described above until a hydrogenation rate of at least 98% is achieved. Stage (II) may be carried out in a reactor used in stage (I), or may be carried out by transferring the reaction solution to a reactor different from the reactor used in stage (I). It is preferable that stage (I) and stage (II) be performed in succession without interruption in terms of production efficiency.

In stage (II), the temperature is set higher than 130° C., preferably equal to or greater than 140° C. The upper limit of the temperature in stage (II) is 190° C. If the temperature in stage (II) is 130° C. or less, either it is difficult to achieve a hydrogenation rate of at least 98 mol % or it takes a very long time to achieve a hydrogenation rate of at least 98 mol %. In addition, the hydrogen pressure is preferably adjusted to at least 2 MPa, more preferably at least 4 MPa, and still more preferably at least 6 MPa, by the introduction of hydrogen gas. The upper limit of the hydrogen pressure is determined depending on the pressure resistance limit of the reactor, but is preferably 10 MPa. By carrying out the hydrogenation reaction under such a hydrogen pressure, it is possible to achieve a high hydrogenation rate in a short time while suppressing the side reactions.

After the completion of the hydrogenation reaction, it is possible to isolate and purify a hydrogenated unsaturated polyhydroxyhydrocarbon polymer which is the resulting product, in accordance with the known methods. For example, when a hydrogenation catalyst is used by being suspended in a reaction solvent, it is possible to recover the hydrogenation catalyst by filtering a liquid containing the reaction product. The recovered hydrogenation catalyst can be regenerated by a known method and reused for the hydrogenation reaction and the like. In addition, by subjecting the liquid containing the reaction product to thin film drying, vacuum drying or the like to remove the reaction solvent, the product can be isolated.

EXAMPLES

Next, the present invention will be described in more detail based on a series of Examples and Comparative Examples. It should be noted that the present invention is not limited to the following Examples.

(Hydroxyl Value)

It is the number of milligrams of potassium hydroxide required to acetylate OH groups contained in 1 g of a sample. It is measured by a method in accordance with JIS K 0070: 1992. The ratio of the hydroxyl value after hydrogenation to the hydroxyl value before hydrogenation was defined as the hydroxyl group retention.

(Iodine Value)

It is a value obtained by converting the amount of halogen that reacts with 100 grams of a sample into the number of grams of iodine. It is measured by a method in accordance with JIS K 0070: 1992.

Example 1

12.01 g of a nickel catalyst supported by diatomaceous earth was charged into an autoclave having a capacity of 0.98 liters and equipped with a warming heater, a stirring mechanism and a thermometer, and nitrogen substitution was carried out. 250 g of a 60% by weight octane solution of terminal hydroxyl group-modified polybutadiene ("G-1000" manufactured by Nippon Soda Co., Ltd., number average molecular weight: 1,400) was added thereto.

Next, hydrogen gas was charged under pressure into this autoclave until a pressure level of 2.0 MPa was achieved. A hydrogenation reaction was carried out by maintaining the temperature at 120 to 130° C. The hydrogen gas was consumed by the reaction, and the hydrogen pressure inside the autoclave was dropped down to 0.2 MPa.

When the pressure reached 0.2 MPa, hydrogen gas was charged under pressure until a pressure level of 2.0 MPa was achieved. This operation was repeated until a hydrogenation rate of 84% was achieved. The time required was 15 hours. The hydroxyl value of the product obtained at this stage was 63.2 KOHmg/g.

The temperature inside the autoclave was increased up to 165° C. Hydrogen gas was charged under pressure until the hydrogen pressure inside the autoclave reached 9.2 MPa. A hydrogenation reaction was carried out for 3 hours by maintaining the temperature at 165° C. The hydrogen gas was consumed by the reaction, and the hydrogen pressure inside the autoclave became 8.3 MPa.

The autoclave was cooled to room temperature. A solution containing the reaction product was filtered to remove the hydrogenation catalyst. The resulting terminal hydroxyl group-modified polybutadiene hydride exhibited a hydrogenation rate of 99%, an iodine value of 13.8 I g/100 g, a hydroxyl value of 64.3 KOHmg/g and a hydroxyl group retention of 90.4%.

Example 2

A terminal hydroxyl group-modified polybutadiene hydride was obtained in the same manner as in Example 1 with the exception that the hydrogen pressure of the hydrogen charging after increasing the temperature inside the autoclave to 165° C. was changed to 6.4 MPa. The resulting terminal hydroxyl group-modified polybutadiene hydride exhibited a hydrogenation rate of 99%, an iodine value of 14.9 I g/100 g, a hydroxyl value of 64.0 KOHmg/g and a hydroxyl group retention of 90.0%.

Example 3

12.01 g of a nickel catalyst supported by diatomaceous earth was charged into an autoclave having a capacity of 0.98 liters and equipped with a warming heater, a stirring mechanism and a thermometer, and nitrogen substitution was carried out. 250 g of a 60% by weight octane solution of terminal hydroxyl group-modified polybutadiene ("G-1000" manufactured by Nippon Soda Co., Ltd., number average molecular weight: 1,400) was added thereto.

Next, hydrogen gas was charged under pressure into the autoclave until a pressure level of 2.0 MPa was achieved. A hydrogenation reaction was carried out by maintaining the temperature at 120 to 130° C. The hydrogen gas was consumed by the reaction, and the hydrogen pressure inside the autoclave was dropped down to 0.2 MPa.

When the pressure reached 0.2 MPa, hydrogen gas was charged under pressure until a pressure level of 2.0 MPa was achieved. This operation was repeated until a hydrogenation rate of 32% was achieved. The time required was 5 hours. The hydroxyl value of the product obtained at this stage was 65.8 KOHmg/g.

Next, hydrogen gas was charged under pressure into the autoclave until a pressure level of 5.5 MPa was achieved. A hydrogenation reaction was carried out while the temperature inside the autoclave was increased up to 165° C. over 2 hours. The hydrogen gas was consumed by the reaction, and the hydrogen pressure inside the autoclave was dropped down to 0.9 MPa. When the temperature reached 165° C., hydrogen gas was charged under pressure until the hydrogen pressure inside the autoclave reached 9.2 MPa. A hydrogenation reaction was carried out for 3 hours by maintaining the temperature at 165° C. The hydrogen gas was consumed by the reaction, and the hydrogen pressure inside the autoclave became 7.0 MPa.

The autoclave was cooled to room temperature. A solution containing the reaction product was filtered to remove the hydrogenation catalyst. The resulting terminal hydroxyl group-modified polybutadiene hydride exhibited a hydrogenation rate of 99%, an iodine value of 15.1 I g/100 g, a hydroxyl value of 63.4 KOHmg/g and a hydroxyl group retention of 89.2%.

Example 4

12.01 g of a nickel catalyst supported by diatomaceous earth was charged into an autoclave having a capacity of 0.98 liters and equipped with a warming heater, a stirring mechanism and a thermometer, and nitrogen substitution was carried out. 250 g of a 60% by weight octane solution of terminal hydroxyl group-modified polybutadiene ("G-1000" manufactured by Nippon Soda Co., Ltd., number average molecular weight: 1,400) was added thereto.

Next, hydrogen gas was charged under pressure into the autoclave until a pressure level of 2.0 MPa was achieved. A hydrogenation reaction was carried out by maintaining the temperature at 120 to 130° C. The hydrogen gas was consumed by the reaction, and the hydrogen pressure inside the autoclave was dropped down to 0.2 MPa.

When the pressure reached 0.2 MPa, hydrogen gas was charged under pressure until a pressure level of 2.0 MPa was achieved. This operation was repeated until a hydrogenation rate of 34% was achieved. The time required was 5 hours. The hydroxyl value of the product obtained at this stage was 67.3 KOHmg/g.

Next, hydrogen gas was charged under pressure into the autoclave until a pressure level of 5.7 MPa was achieved. A hydrogenation reaction was carried out while the temperature inside the reaction system was increased up to 165° C. over 2 hours. The hydrogen gas was consumed by the reaction, and the hydrogen pressure inside the autoclave was dropped down to 1.5 MPa.

When the temperature reached 165° C., hydrogen gas was charged under pressure until the hydrogen pressure inside the autoclave reached 7.8 MPa. A hydrogenation reaction was carried out for 3 hours by maintaining the temperature at 165° C. The hydrogen gas was consumed by the reaction, and the hydrogen pressure inside the autoclave became 5.7 MPa.

The autoclave was cooled to room temperature. A solution containing the reaction product was filtered to remove the hydrogenation catalyst. The resulting terminal hydroxyl group-modified polybutadiene hydride exhibited a hydrogenation rate of 99%, an iodine value of 13.9 I g/100 g, a hydroxyl value of 62.1 KOHmg/g and a hydroxyl group retention of 87.3%.

Comparative Example 1

12.01 g of a nickel catalyst supported by diatomaceous earth was charged into an autoclave having a capacity of 0.98 liters and equipped with a warming heater, a stirring mechanism and a thermometer, and nitrogen substitution was carried out. 250 g of a 60% by weight octane solution of terminal hydroxyl group-modified polybutadiene ("G-1000" manufactured by Nippon Soda Co., Ltd., number average molecular weight: 1,400) was added thereto.

Next, hydrogen gas was charged under pressure into the autoclave until a pressure level of 2.0 MPa was achieved. A hydrogenation reaction was carried out by maintaining the temperature at 120 to 130° C. The hydrogen gas was consumed by the reaction, and the hydrogen pressure inside the autoclave was dropped down to 0.2 MPa.

When the pressure reached 0.2 MPa, hydrogen gas was charged under pressure until a pressure level of 2.0 MPa was achieved. This operation was repeated until a hydrogenation rate of 96% was achieved. The time required was 15 hours.

The autoclave was cooled to room temperature. A solution containing the reaction product was filtered to remove the hydrogenation catalyst. The resulting terminal hydroxyl group-modified polybutadiene hydride exhibited a hydrogenation rate of 96%, an iodine value of 30.7 I g/100 g, a hydroxyl value of 65.5 KOHmg/g and a hydroxyl group retention of 92.1%.

Comparative Example 2

12.01 g of a nickel catalyst supported by diatomaceous earth was charged into an autoclave having a capacity of 0.98 liters and equipped with a warming heater, a stirring mechanism and a thermometer, and nitrogen substitution was carried out. 250 g of a 60% by weight octane solution of terminal hydroxyl group-modified polybutadiene ("G-1000" manufactured by Nippon Soda Co., Ltd., number average molecular weight: 1,400) was added thereto.

Next, hydrogen gas was charged under pressure into the autoclave until a pressure level of 2.0 MPa was achieved. A hydrogenation reaction was carried out by maintaining the temperature at 140 to 150° C. The hydrogen gas was consumed by the reaction, and the hydrogen pressure inside the system was dropped down to 0.2 MPa.

When the pressure reached 0.2 MPa, hydrogen gas was charged under pressure until a pressure level of 2.0 MPa was achieved. This operation was repeated until a hydrogenation rate of 98% was achieved. The time required was 15 hours.

The autoclave was cooled to room temperature. A solution containing the reaction product was filtered to remove the hydrogenation catalyst. The resulting terminal hydroxyl group-modified polybutadiene hydride exhibited a hydrogenation rate of 98%, an iodine value of 20.8 I g/100 g, a hydroxyl value of 61.8 KOHmg/g and a hydroxyl group retention of 86.9%.

As shown by the above results, even if a hydrogenation reaction is carried out over a prolonged period of time by maintaining the temperature at 120 to 130° C., the hydrogenation rate hardly increases. In addition, if a hydrogenation reaction is carried out over a long period of time by maintaining the temperature at 140 to 150° C., the hydrogenation rate can be enhanced, although the hydroxyl value is reduced.

On the other hand, according to the method of the present invention, a high hydrogenation rate can be achieved in a short reaction time without substantially reducing the hydroxyl value.

The invention claimed is:
1. A method for producing a hydrogenated unsaturated polyhydroxyhydrocarbon polymer comprising:
   hydrogenating an unsaturated polyhydroxyhydrocarbon polymer in a hydrogen atmosphere under the presence of a hydrogenation catalyst and a reaction solvent in the following two stages (I) and (II):

(I) carrying out a hydrogenation reaction in a temperature range of 80° C. to 130° C. until a hydrogenation rate of at least 30 mol % is achieved; and then (II) carrying out a hydrogenation reaction at a temperature higher than 130° C. until a hydrogenation rate of at least 98 mol % is achieved.

2. The method according to claim 1, wherein a hydrogen pressure in stage (I) is equal to or less than 6 MPa.

3. The method according to claim 1, wherein a hydrogen pressure in stage (II) is equal to or more than 2 MPa.

4. The method according to claim 1, wherein the hydrogenation catalyst is at least one selected from the group consisting of a nickel-based catalyst, a cobalt-based catalyst, a ruthenium-based catalyst, a rhodium-based catalyst, a palladium-based catalyst and a platinum-based catalyst.

* * * * *